United States Patent

[11] 3,578,927

| | | | |
|---|---|---|---|
| [72] | Inventor | Adrian W. Roth<br>Aarau, Switzerland | |
| [21] | Appl. No. | 802,604 | |
| [22] | Filed | Feb. 26, 1969 | |
| [45] | Patented | May 18, 1971 | |
| [73] | Assignee | Sprecher & Schuh AG<br>Aarau, Switzerland | |
| [32] | Priority | Feb. 29, 1968, Mar. 21, 1968 | |
| [33] | | Switzerland | |
| [31] | | 3073/68 and 4413/68<br>Pat. 462,925 | |

[54] HIGH VOLTAGE SWITCHING ASSEMBLY
7 Claims, 6 Drawing Figs.

[52] U.S. Cl............................................. 200/145,
200/148, 317/103
[51] Int. Cl.................................................. H01h 33/64,
H01h 9/40
[50] Field of Search........................................ 200/148.2,
145, 148, 48 (for), 148.4; 317/103

[56] References Cited
UNITED STATES PATENTS

| | | | | |
|---|---|---|---|---|
| 3,214,553 | 10/1965 | Leeds............................ | 200/145X |
| 3,311,727 | 3/1967 | Picard........................... | 200/148 |
| 3,356,798 | 12/1967 | Mckinnon...................... | 200/148(.2)X |
| FOREIGN PATENTS | | | | |
| 89,220 | 4/1967 | France........................... | 200/148 |
| 1,382,896 | 11/1964 | France........................... | 200/148 |
| 952,278 | 3/1964 | Great Britain................. | 317/103 |
| 362,450 | 7/1962 | Switzerland................... | 200/148(.2) |

Primary Examiner—Robert K. Schaefer
Assistant Examiner—Robert A. Vanderhye
Attorney—Waters, Roditi, Schwartz & Nissen ABSTRACT: A high-voltage, fluid insulation switching station for a ring bus bar arrangement built up on a separate phase basis, having switching assemblies including three individually enclosed circuit breakers, earthing switches, instrument transformers and voltage transformers, cable dividing boxes and outdoor lead-throughs, the three circuit breakers with associated earthing switches and current transformers required for each connecting point of the bus bar arrangement being arranged within a T-shaped metal housing, wherein the individually enclosed circuit breakers of any one phase in parallel rows form, in sequence with T-shaped housings, a ring arranged, with like parts of the three phases being disposed on axes perpendicular to said parallel rows of circuit breakers.

Patented May 18, 1971

HIGH VOLTAGE SWITCHING ASSEMBLY

This invention relates to a high voltage switching assembly and to a switching station including such assembly.

It is known to construct liquid- or gas-insulated metal-enclosed high-voltage switching stations by combining a number of integers such as phase isolators, circuit breakers, instrument transformers and bus bars. In various arrangements of this kind, for instance, in the case of ring bus bar arrangements, three phase isolators with or without earth-continuity isolators are disposed at the junctions; a large number of joints exist along the line of the metal enclosure and so sealing causes difficulties.

It is an object of the invention to simplify the construction of such a station by appreciably reducing the number of places requiring sealing and to provide a protection for the feeders impaired neither by casing fault currents nor by switch lead-through disturbances.

Accordingly, there is provided a high voltage switching assembly comprising a T-shaped housing, preferably filled with insulating gas and/or liquid, an electrically conductive switching member movable longitudinally within each of the three limbs of the housing, three fixed contacts, one for each of the switching members, within the housing at the intersection of the limbs, the fixed contacts being in electrically conductive connection with one another and/or with other parts of the assembly, electrical contacts within each limb of the housing adapted to make rubbing electrical contact with the switching member, and means for driving each switching member into and out of electrical contact with the corresponding one of the fixed contacts.

Preferably, an instrument transformer screened from live parts by earthed screens and comprising at least one wound iron core is disposed inside the common substantially T-shaped metal casing around at least one of the movable switching members.

In accordance with another feature of the invention there is provided a switching station comprising liquid insulation or gas insulation for a ring bus bar arrangement built up on a separate phase basis, with the isolating switching assemblies described above, earthing switches, instrument transformers and voltage transformers, cable dividing boxes, outdoor lead-throughs and individually enclosed circuit breakers, the voltage transformers and the outdoor lead-throughs being fitted onto the T-shaped metal housing, wherein the individually enclosed circuit breakers of any one phase in parallel rows form, in sequence with the T-shaped metal cases interconnecting them, a ring arrangement, with like parts of the three phases being disposed on axes perpendicular to the parallel rows of the circuit breakers.

The contour resulting from the sequence of individually enclosed circuit breakers disposed in parallel rows and T-shaped metal casings forms, when the ring arrangement is seen in plan, a closed polygon which can be a trapezoid or rectangle or parallelogram.

The individually enclosed circuit breakers which are associated with one another in the three phases can be operated either by a common drive or individually.

The invention will now be described by way of example and with reference to the accompanying drawings wherein.

Figure 1:
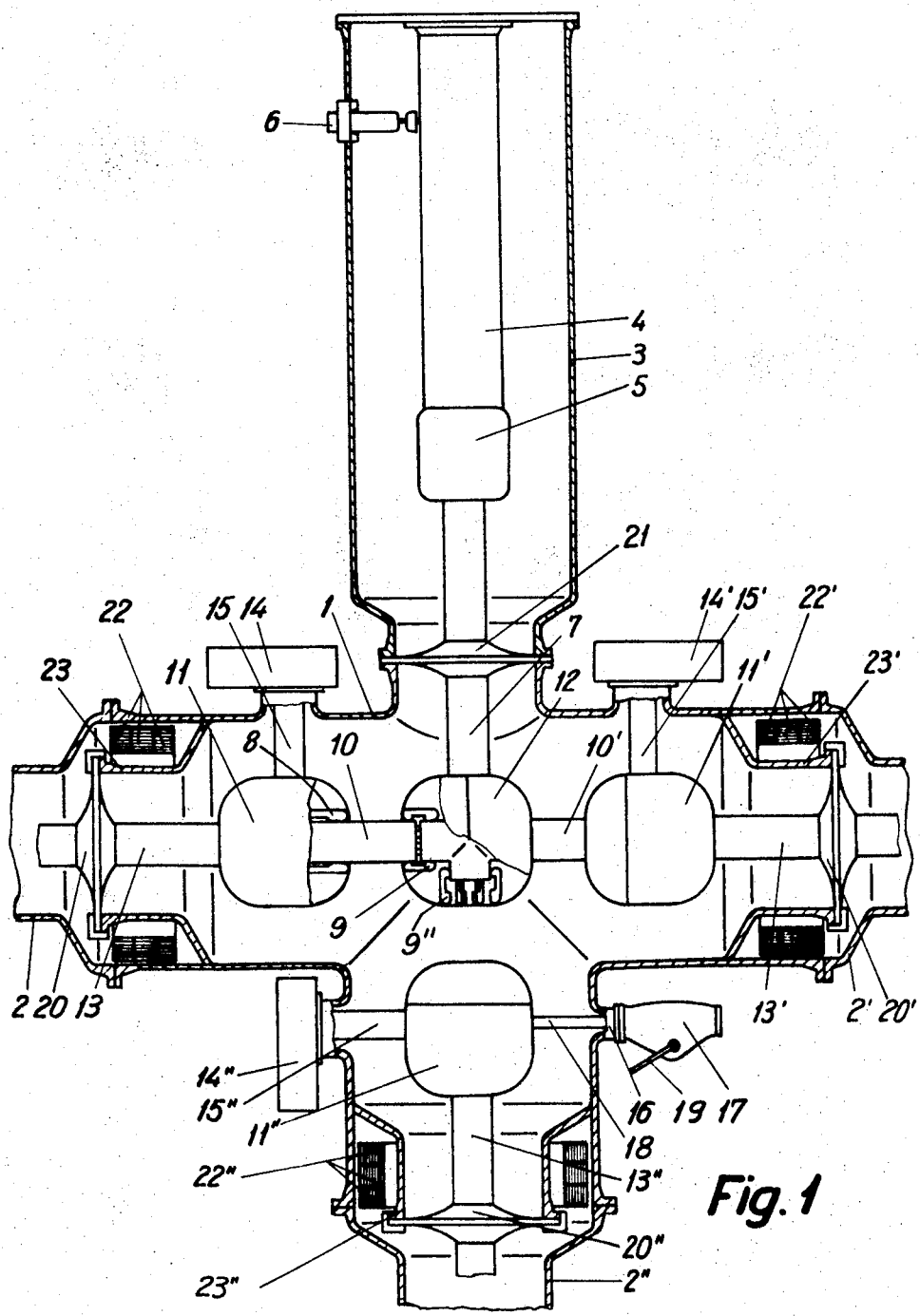
FIG. 1 shows three phase isolators, which are arranged in a T and which comprise earthing switches and instrument transformers, disposed in a common T-shaped metal casing to which a capacitive voltage divider is fitted.

Referring now to FIG. 1, like the other metal enclosures of the switching station, a common T-shaped metal casing 1 in FIG. 1 is preferably filled with an electronegative insulating gas, e.g. $SF_6$. Tubular metal enclosures 2, 2', 2'' of the other parts of the station, and a metal enclosure 3 of a capacitive voltage divider, are secured to casing 1. The divider comprises a capacitor which is received in an insulating tube 4 and which has a screening electrode 5, an insulated medium-voltage connection 6 and a high-voltage connection 7. Some other part of the station can be connected instead of the capacitive voltage divider, or the aperture in casing 1 can be covered with a blank flange.

Disposed inside the common T-shaped metal casing 1 are the three single phase isolating switching members one of which is shown open and the other two closed. The operative parts of the three phase isolators are of like construction. The operative parts shown in FIG. 1 comprise a rubbing contact 8, main contacts 9, 9'', moving switching tubes 10, 10', screening electrodes 11, 11', 11'' which extend around the rubbing contacts and the switching tube drive means, and a screening electrode 12 which covers the main contacts. These latter are secured to the high-voltage connection 7 of the capacitive voltage divider. If some other part of the equipment is connected instead of the voltage divider, the main contacts can be secured to the connection for such other part. If the aperture in casing 1 is covered with a blank flange, the main contacts can be secured thereto with the interposition of an appropriate post insulator. The rubbing contacts are electrically connected to the other parts of the equipment by tubes 13, 13', 13''. Drives 14, 14', 14'' disposed outside the common casing 1 act by way of insulated rotatable shafts 15, 15', 15'' and the drive devices disposed in the screening electrodes 11, 11', 11'' to move the switching tubes.

An earthing switch is fitted to that of the phase isolators which is shown open. The main contact of the latter earth-continuity isolator is disposed below the screening 11'' and its rubbing contact is disposed in the bottom part 16 of an earth-continuity isolator drive 17 disposed outside casing 1. Drive 17 moves switching pin 18 of the earth-continuity isolator lengthwise between the "on" and "off" positions. Drive 17 can be operated manually by means of a lever 19. All the phase isolators can also have earth-continuity isolators.

The tubes 13, 13', 13'' and the high-voltage connection 7 of the capacitive voltage divider are secured in casing 1 by discoid insulating members 20, 20', 20'', 21, which separate the phase isolator gas spaces from the other parts of the equipment and from the gas space of the capacitive voltage divider. Gastight closures are disposed inside the tubes 13, 13', 13'', 7.

To measure the currents in the tubes 13, 13', 13'', instrument transformers 22, 22', 22'' comprising a number of wound iron cores are disposed inside casing 1 and are screened from live parts by screens 23, 23', 23''.

A particular advantage of the invention is that the arrangement of the instrument transformers shown in FIG. 1 ensures certain detection of all earth faults arising in equipment further down the line, more particularly in circuit breakers, as contrasted with prior arrangements, where when circuit breakers are disposed in an earthed tank, the instrument transformer is constructed as a component of the circuit breaker lead-through. The invention also obviates wrong indications due to fault currents in the metal enclosure—i.e., the need to have insulating places in the metal enclosure.

Figure 2:
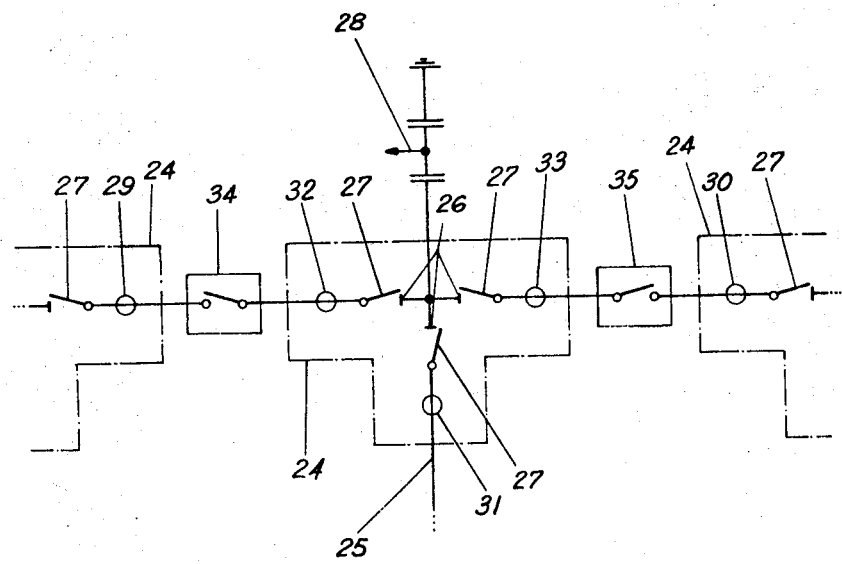
FIG. 2 shows part of the circuit diagram for a ring bus bar arrangement.

FIG. 2 shows some of the circuit diagram of a ring bus bar arrangement. The symbols of the devices disposed inside any of the common T-shaped metal cases are surrounded by chain-dotted framing 24. If it is required to protect a feeder 25 connected to the equipment according to the invention by an impedance or distance protection, the interconnected main contacts 26 of the phase isolators 27 are connected to a capacitive voltage transformer 28 fitted to the common T-shaped metal casing.

For impedance protection of feeder 25, the signals of the instrument transformers 29, 30 and of the voltage transformer 28 are used. If a differential protection is used, the signals of the instrument transformers 29—31 are used. The instrument transformers 32, 33 are used to protect the adjacent feeders.

With the instrument transformers associated with one another in this way, complete overlapping of protection is provided by way of the circuit breaker 34, 35 feeding the particular feeder concerned.

Advantages are the reduced number of sealing places and the fact that the dimensions of the arrangement hereinbefore described are much smaller than the dimensions of an arrangement built up from three separate isolators and the instrument and voltage transformers.

Figure 3:
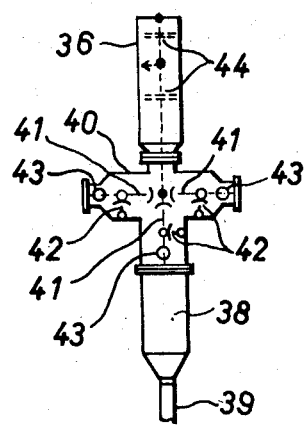
FIG. 3 shows a T-shaped metal casing to which a voltage-transformer casing and a cable dividing box are fitted.

Referring to FIG. 3, a voltage-transformer casing 36 and a casing 38 of a cable dividing box with associated cable 39 are fitted to the end of a T-shaped metal housing 40. The symbols for the integers disposed inside the housings 36, 40 are shown in chain lines. Disposed inside housing 40 are three isolators 41, three earth-continuity isolators 42 and three instrument transformers 43. The main contacts of the isolators 41 are secured to the high-voltage connection of a capacitive divider which is formed by capacitors 44 and which is received in housing 36. The capacitive divider can be omitted, in which event the aperture in housing 40 is covered with a blank flange and the main contacts of the isolators 41 are secured to it by way of an appropriate post insulator.

Drives which are disposed outside housing and which are not shown in FIG. 3 provide individual and independent operation of the isolators 41 and 42. Lead-throughs provide a gastight closure at the connection places of the chambers whose outer boundaries are formed by the housings 36, 40, 38 and which are filled preferably with an electronegative insulating gas, e.g. $SF_6$.

Figure 4:
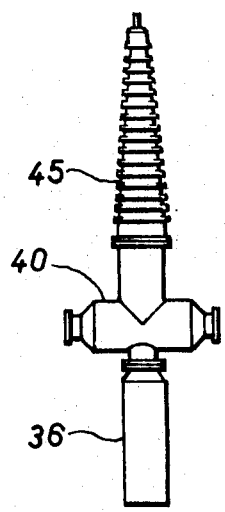
FIG. 4 shows a T-shaped metal casing to which a voltage-transformer casing and an outdoor lead-through are fitted.

In FIG. 4, an outdoor lead-through 45 instead of the cable dividing box casing 38 of FIG. 1 is fitted to the T-shaped metal housing 40 which has the voltage transformer casing 36. In this arrangement housing 36 is disposed below casing 40. Depending upon individual requirements, housing 36 with the voltage divider in it can be omitted.

Figure 5:
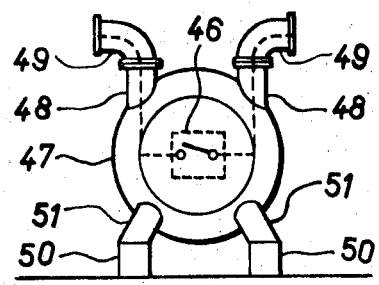
FIG. 5 shows an enclosed circuit breaker.

Referring to FIG. 5, an enclosed circuit breaker represented by a symbol 46 is received in a metal casing 47 having connections 48 to which elbows 49 are fitted so that the integers shown in FIG. 3 and FIG. 4 can be mounted laterally on casing 47. Preferably, the same is filled with an electronegative gas, e.g. $SF_6$. The lead-throughs of the integers connected to the elbows 49 seal off the gas space of the circuit breaker. Intermediate members 50 disposed below feet 51 can be removed, in the case of fixedly mounted elbows 49, for replacement or inspection of the circuit breaker.

Figure 6:
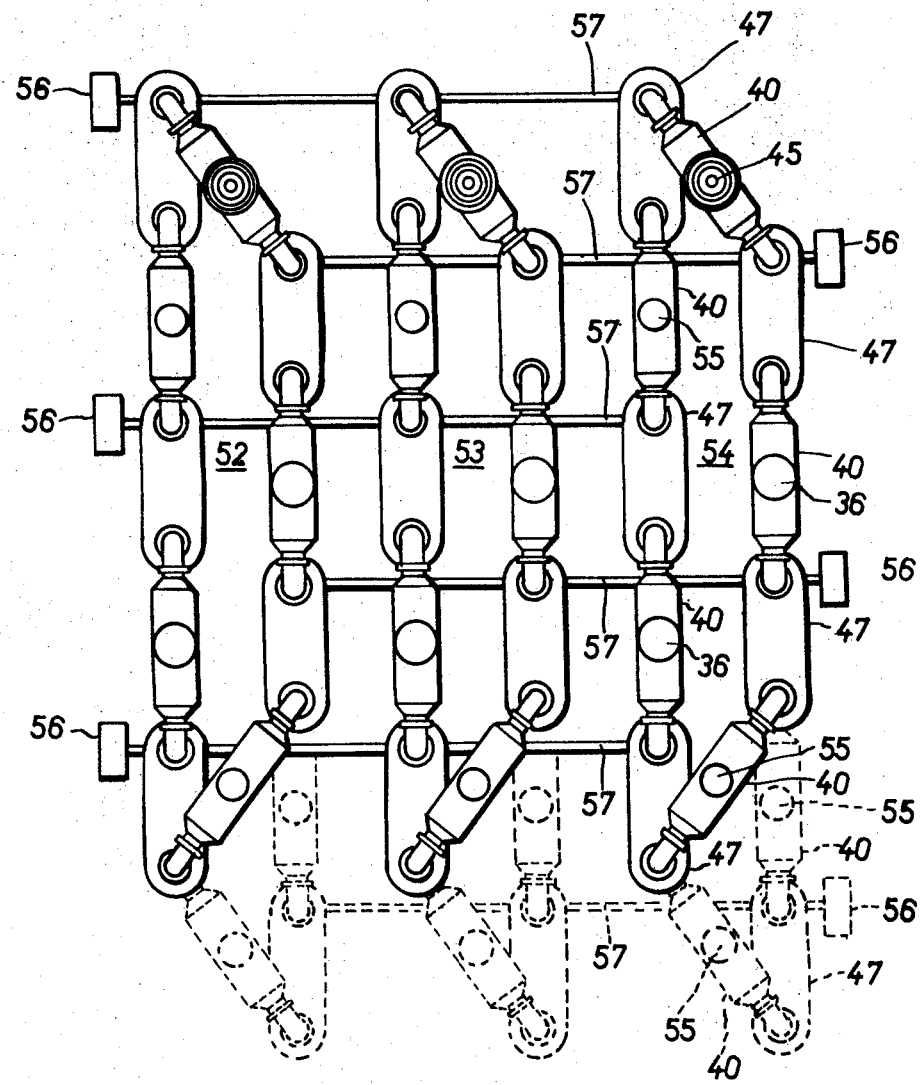
FIG. 6 is a plan view showing the arrangement of a switching station.

FIG. 6 is a plan view of a three-phase high-voltage switching station built up from the integers shown in FIGS. 3, 4 and 5. The three phases 52, 53, 54 of the station are of identical construction. Basically the various phases comprise the circuit breakers, which are disposed in parallel rows and received in metal housings 47 and the T-shaped metal housings 40, which are connected between the circuit breakers. The casings 40 have either outdoor lead-throughs 45 or casings (not shown in FIG. 6) for cable dividing boxes. The feeders are disposed in the bottom part of the station. The metal housings 40 can have capacitive voltage dividers in housings 36 or the apertures can be covered by blank flanges 55.

The contour of the various phases 52, 53, 54 of the switching station shown in solid lines in FIG. 6 is trapezoidal. The station can be amplified very simply if the final housing 40 of the trapezoidal arrangement is turned into the chain-line position and if a member comprising a housing 47 and a housing 40 and shown in chain lines is introduced into the ring arrangement. This amplification gives each phase of the station a parallelogram-shaped contour.

The particular advantages of arrangements having a trapezoidal or parallelogram-shaped contour are ease of amplification, the fact that little space is required, and the fact that like items, such as breakers, isolators and feeders, of the three phases are always disposed on the same axis.

The integers of the various phases can also be arranged with a rectangular contour.

Common drives 56 drive the associated circuit breakers of the three phases via linkages 57. If required, however, all the circuit breakers can have individual drives.

I claim:

1. A high-voltage, fluid insulation switching station for a ring bus bar arrangement built up on a separate phase basis, having switching assemblies including three individually enclosed circuit breakers, earthing switches, instrument transformers and voltage transformers, cable dividing boxes and outdoor lead-throughs, the three circuit breakers with associated earthing switches and current transformers required for each connecting point of the bus bar arrangement being arranged with a T-shaped metal housing, wherein the individually enclosed circuit breakers of any one phase in parallel rows form, in sequence with said T-shaped housings, a ring arranged, with like parts of the three phases being disposed on axes perpendicular to said parallel rows of circuit breakers.

2. A switching station as claimed in claim 1, wherein the sequence of said individually enclosed circuit breakers disposed in parallel rows and T-shaped metal housings in the ring arrangement of any one phase forms a closed polygon in plan view.

3. A switching station as claimed in claim 2, wherein the closed polygon is a trapezoid.

4. A switching station as claimed in claim 2, wherein the closed polygon is a rectangle.

5. A switching station as claimed in claim 2, wherein the closed polygon is a parallelogram.

6. A switching station as claimed in claim 1, wherein the operating members of said three individually enclosed circuit breakers disposed at like places of the three adjacent ring arrangements are operatively interconnected by a linkage and are connected to a common mechanical drive.

7. A switching station as claimed in claim 1, wherein each of said individually enclosed circuit breaker has a mechanical drive.